United States Patent
Chen et al.

(10) Patent No.: US 9,971,745 B2
(45) Date of Patent: *May 15, 2018

(54) METHOD AND SYSTEM FOR PROVIDING SUGGESTED TAGS ASSOCIATED WITH A TARGET WEB PAGE FOR MANIPULATION BY A USER OPTIMAL RENDERING ENGINE

(71) Applicant: International Business Machines Corporation, Armonk, NY (US)

(72) Inventors: Rebecca L J Chen, Taipei (TW); Steven M D Jiang, Taipei (TW); Jeffrey C H Liu, Taipei (TW); Giant H M Tu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 758 days.

This patent is subject to a terminal disclaimer.

(21) Appl. No.: 14/043,825

(22) Filed: Oct. 1, 2013

(65) Prior Publication Data

US 2014/0108921 A1 Apr. 17, 2014

Related U.S. Application Data

(63) Continuation of application No. 12/558,707, filed on Sep. 14, 2009, now Pat. No. 8,578,264.

(30) Foreign Application Priority Data

Sep. 17, 2008 (TW) .............................. 97135596 A

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/241* (2013.01); *G06F 17/30896* (2013.01)

(58) Field of Classification Search
CPC ............. G06F 17/30884; G06F 17/241; G06F 17/2247
See application file for complete search history.

(56) References Cited

U.S. PATENT DOCUMENTS 5,893,126 A * 4/1999 Drews .................... G06F 3/0481
715/203
7,003,522 B1 * 2/2006 Reynar ............. G06F 17/30896
707/736

(Continued)

*Primary Examiner* — Scott Baderman
*Assistant Examiner* — Benjamin J Smith
(74) *Attorney, Agent, or Firm* — Steven M. Greenberg, Esq.; CRGO Law

(57) ABSTRACT

Disclosed are method and a system, as well as a computer program product for providing suggested tags associated with a target web page for manipulation by a user. The preferred embodiment of the present invention is implemented by generating a list of keywords associated with the target web page as suggested tags; adding the keywords as suggested tags into the page and transforming the page bearing the keywords into a HTML file, while the user decides to bookmark the page; and creating a layer of new transparent or semi-transparent window overlaying an original window displaying the page, the transformed page with said keywords being rendered on the new window for displaying the suggestion for said user's manipulation.

15 Claims, 11 Drawing Sheets

(51) Int. Cl.
*G06F 17/24* (2006.01)
*G06F 17/30* (2006.01)

(56) References Cited

U.S. PATENT DOCUMENTS

| | | | | |
|---|---|---|---|---|
| 7,209,928 B2* | 4/2007 | Kenyon | ............ | G06F 17/30864 |
| 7,246,134 B1* | 7/2007 | Kitain | ................ | G06F 17/2247 |
| 7,257,585 B2* | 8/2007 | Stevenson | ......... | G06F 17/30887 |
| | | | | 707/809 |
| 7,472,115 B2* | 12/2008 | Benysh | ............ | G06F 17/30867 |
| 7,529,797 B2* | 5/2009 | Tseng | ................ | G06F 17/3089 |
| | | | | 709/201 |
| 7,698,311 B2* | 4/2010 | Stevenson | ......... | G06F 17/30887 |
| | | | | 707/602 |
| 7,761,436 B2* | 7/2010 | Norton | .............. | G06F 17/30997 |
| | | | | 707/705 |
| 7,853,558 B2* | 12/2010 | Brindley | .......... | G06F 17/30038 |
| | | | | 707/608 |
| 7,856,414 B2* | 12/2010 | Zee | ........................ | G06Q 10/02 |
| 7,930,324 B2* | 4/2011 | Kenyon | ............ | G06F 17/30864 |
| | | | | 707/805 |
| 7,975,019 B1* | 7/2011 | Green | ................ | G06Q 30/0241 |
| | | | | 705/14.4 |
| 7,975,020 B1* | 7/2011 | Green | ................ | G06Q 30/0241 |
| | | | | 705/14.4 |
| 8,010,901 B1* | 8/2011 | Rogers | ............. | G06F 17/30873 |
| | | | | 709/204 |
| 8,015,496 B1* | 9/2011 | Rogers | ............. | G06F 17/30873 |
| | | | | 709/204 |
| 8,122,014 B2* | 2/2012 | Brindley | .......... | G06Q 30/0241 |
| | | | | 705/14.4 |
| 8,131,767 B2* | 3/2012 | Brindley | .......... | G06F 17/30038 |
| | | | | 707/791 |
| 8,312,059 B2* | 11/2012 | Kenyon | ........... | G06F 17/30864 |
| | | | | 707/805 |
| 8,433,995 B1* | 4/2013 | Karam | ............ | G06F 17/30884 |
| | | | | 715/206 |
| 8,578,264 B2* | 11/2013 | Chen | ................. | G06F 17/2247 |
| | | | | 715/231 |
| 2003/0050927 A1* | 3/2003 | Hussam | ............ | G06F 17/30696 |
| 2003/0124502 A1 | 7/2003 | Chou | | |
| 2004/0049488 A1* | 3/2004 | Kenyon | ............ | G06F 17/30864 |
| 2004/0100498 A1* | 5/2004 | Dietz | ................... | G06F 17/241 |
| | | | | 715/760 |
| 2007/0118802 A1* | 5/2007 | Gerace | ............ | G06F 17/30867 |
| | | | | 715/738 |
| 2007/0156636 A1* | 7/2007 | Norton | .............. | G06F 17/30867 |
| 2007/0239726 A1 | 10/2007 | Weiss et al. | | |
| 2007/0288247 A1* | 12/2007 | Mackay | ................. | G06Q 10/00 |
| | | | | 705/1.1 |
| 2008/0034291 A1* | 2/2008 | Anderson | ......... | G06F 17/30861 |
| | | | | 715/700 |
| 2008/0040313 A1* | 2/2008 | Schachter | ......... | G06F 17/30884 |
| 2008/0040674 A1* | 2/2008 | Gupta | ............... | G06F 17/30884 |
| | | | | 715/745 |
| 2008/0046458 A1* | 2/2008 | Tseng | .................. | G06F 17/3089 |
| 2008/0086496 A1* | 4/2008 | Kumar | ................ | G06F 17/3089 |
| 2008/0091549 A1* | 4/2008 | Chang | ................... | G06Q 30/02 |
| | | | | 705/14.66 |
| 2008/0097975 A1* | 4/2008 | Guay | ................ | G06F 17/30265 |
| 2008/0154949 A1* | 6/2008 | Brooks | ............ | G06F 17/30884 |
| 2008/0250337 A1* | 10/2008 | Lemmela | ............ | G09B 29/006 |
| | | | | 715/764 |
| 2008/0282198 A1* | 11/2008 | Brooks | ................... | G06Q 10/10 |
| | | | | 715/854 |
| 2009/0012991 A1* | 1/2009 | Johnson | ................ | G06Q 30/02 |
| 2009/0019039 A1* | 1/2009 | Brindley | ........... | G06F 17/30887 |
| 2009/0063264 A1* | 3/2009 | Leung | ............... | G06F 17/30867 |
| | | | | 705/14.39 |
| 2009/0113281 A1* | 4/2009 | Close | ................ | G06F 17/30716 |
| | | | | 715/205 |
| 2009/0125544 A1* | 5/2009 | Brindley | ........... | G06F 17/30038 |
| 2009/0204609 A1* | 8/2009 | Labrou | ............... | G06F 17/3064 |
| 2009/0222738 A1* | 9/2009 | Drieschner | ............. | G06F 17/30 |
| | | | | 715/739 |
| 2009/0241035 A1* | 9/2009 | Tseng | ................. | G06F 17/3089 |
| | | | | 715/753 |
| 2009/0318168 A1* | 12/2009 | Khosravy | .......... | G06Q 30/0241 |
| | | | | 455/456.3 |
| 2009/0319181 A1* | 12/2009 | Khosravy | .............. | G01C 21/20 |
| | | | | 701/532 |
| 2010/0070448 A1* | 3/2010 | Omoigui | .......... | H01L 27/1463 |
| | | | | 706/47 |
| 2010/0070851 A1* | 3/2010 | Chen | ................. | G06F 17/30896 |
| | | | | 715/236 |
| 2010/0094859 A1* | 4/2010 | Gupta | ............... | G06F 17/30884 |
| | | | | 707/709 |
| 2010/0131447 A1* | 5/2010 | Creutz | ................. | G06F 3/0237 |
| | | | | 706/52 |
| 2010/0161620 A1* | 6/2010 | Lamere | ............ | G06F 17/30749 |
| | | | | 707/749 |
| 2010/0332964 A1* | 12/2010 | Duman | ................ | G06F 17/241 |
| | | | | 715/230 |
| 2014/0108921 A1* | 4/2014 | Chen | ................. | G06F 17/30896 |
| | | | | 715/236 |

* cited by examiner

```
<?xml version="1.0" encoding="utf-8"?>
<xsl:stylesheet version="1.0" xmlns:xsl="http://www.w3.org/1999/XSL/Transform">
    <xsl:output method="html"/>
    <xsl:template match="/">
        <html><xsl:apply-templates/></html>
    </xsl:template>
    <xsl:template match="html/head">
        <head>
            <link rel="stylesheet" type="text/css" href="custom.css"/>
            <xsl:apply-templates/>
        </head>
    </xsl:template>
    <xsl:template match="html/head/title">
        <xsl:copy-of select="."/>
    </xsl:template>
    <xsl:template match="html/body">
        <body>
        <script type="text/javascript">var userTagArray=new Array(); function AddTag(tagName)
{ if( SearchTag( tagName, userTagArray ) == 0 ) { userTagArray.push( tagName ); } else
{ userTagArray.splice( idx, 1 ); } document.getElementById('TagList').innerText =
userTagArray.join(); } function BookmarkThisPage() { var finalTag=userTagArray.join(); var
userTag=document.getElementById('TagList').value; if( userTag == "" ) finalTag = "";
alert( finalTag ); } function SearchTag(tagName, tagArray) { var iFound = 0; for( idx in tagArray )
{ if( tagArray[idx] == tagName ) { iFound = 1; break; } } return iFound; } function UserInputTag()
{ var tagNow = document.getElementById('TagList').value; var tagNowArray = tagNow.split( "," );
var tmpTag; for( idx1 in tagNowArray ) { tmpTag = tagNowArray[idx1]; if( SearchTag( tmpTag,
userTagArray ) == 0 ) { userTagArray.push( tmpTag ); } } for( idx2 in userTagArray ) { tmpTag =
userTagArray[idx2]; if( SearchTag( tmpTag, tagNowArray ) == 0 ) { userTagArray.splice( idx2,
1 ); } } }</script>
            <xsl:for-each select="./*">
                <xsl:choose>
                    <xsl:when test="name() = 'tag'">
                        <xsl:value-of select="../text()" />
                        <xsl:variable name="TagName"    select="."        />
```

FIG. 7

```
            <xsl:variable name="Weight" select="./@weight" />
            <xsl:variable name="NewName"  select="concat('tag', $Weight )"  />
            <xsl:element name="a">
                <xsl:attribute name="id">
                    <xsl:value-of select="$NewName"/>
                </xsl:attribute>
                <xsl:attribute name="onClick">
                    <xsl:value-of select="concat( 'AddTag(', "'", $TagName, "'", ')' )"/>
                </xsl:attribute>
                <xsl:value-of select="$TagName" />
            </xsl:element>
            <xsl:value-of select="following::text()" />
        </xsl:when>
        <xsl:otherwise>
            <xsl:copy-of select="."/>
        </xsl:otherwise>
    </xsl:choose>
</xsl:for-each>
<table class="TagListBox"><tbody><tr><td>
<p class="TagList">Do you want to add more tags?<br>
<input type="text" id="TagList" name="UserTagList" value=""
onChange="UserInputTag()"/><input type="image" src="submit.gif"
onClick="BookmarkThisPage()"/></br></p>
</td></tr></tbody></table>
        </body>
    </xsl:template>
</xsl:stylesheet>
```

FIG. 7 —Continued

```
<?xml version="1.0" encoding="utf-8"?>
<xsl:stylesheet version="1.0" xmlns:xsl="http://www.w3.org/1999/XSL/Transform">

<xsl:template match="/Display">
body    {background-color:gray; color:gray; z-index:9;}
.TagList    {background-color:#5f5f5f; color:white; font-weight: bold;}
.TagListbox {width: 20%; normal; background-color:#5f5f5f; border="0";}
        <xsl:apply-templates />
    </xsl:template>

<xsl:template match="/Display/MyTag">
#tag10 {font-size:20pt; color:<xsl:value-of select="./color"/>; font-weight: bold;}
    </xsl:template>

<xsl:template match="/Display/OtherTag">
#tag9 {font-size:17pt; color:<xsl:value-of select="./color"/>; font-weight: bold;}
    </xsl:template>

</xsl:stylesheet>
```

FIG.8

METHOD AND SYSTEM FOR PROVIDING SUGGESTED TAGS ASSOCIATED WITH A TARGET WEB PAGE FOR MANIPULATION BY A USER OPTIMAL RENDERING ENGINE

CROSS REFERENCE TO RELATED APPLICATIONS

This application claims priority under 35 U.S.C. § 119 to Taiwanese Patent Application No. 97135596 filed Sep. 17, 2008, the entire text of which is specifically incorporated by reference herein.

FIELD OF THE INVENTION

The present invention relates generally to provide a display interface for manipulation by a user, and more particularly to a display interface technique used for a tag-based online bookmark system.

BACKGROUND OF THE INVENTION

A web browser is a software application used to locate and display web pages. To locate a web page with a browser, a user must know the web address of the web page, referred to as a uniform resource locator (URL). However, URLs are often not representative of the associated content. In some cases, the URLs may be exceptionally long or simply non-descriptive, and hence the entry of the URL in the entry field of a browser can be a difficult task for many users. If a user does not know the URL of the web page or just wants to find information on a particular topic, a user typically needs to use a search engine. When a user wants to locate information on a particular topic, he or she inputs keywords in a search interface of a search engine.

Bookmarks, normally called "My Favorites" in Internet Explorer, are a convenient design available in most popular web browsers to store URLs (or called links) of web pages that a user has visited and chosen to save, and thus a user can access a favorite web page via a bookmark to the web page with no need to remember the URLs, hereinafter referred to as a browser-based bookmark system. Despite its usefulness, the current arrangement of bookmarks is not without its drawbacks. For example, adding bookmarks to a bookmark file or a particular bookmark folder in the browser is manually intensive. As the number of bookmarks in the browser increases dramatically, updating bookmarks, i.e. removing the old address and entering the new one, is very slow and inefficient.

Social networks provide another method for users to more quickly locate websites of interest. One example is social bookmark websites, e.g. del.icio.us, dogear and furl etc. as illustrated in FIG. 1, which allow users to tag URLs and share tagged URLs with other users. The users will save bookmarks or tags associated with a web page of interest at the bookmark website. Tagging is a process by which users assign labels in the form of keywords to web contents with a purpose to share, discover and recover them. Users may "tag" a web page of interest by associating a term or label with the web page allowing the categorization of different web pages based on the tag. Furthermore, users may search other users' bookmarks based on a particular topic they are interested in to quickly locate relevant web pages. Accordingly, the social bookmark sites are also called "Tag-based online bookmark systems".

Compared with traditional bookmark systems, the tagged-based online bookmark systems provide users the benefit of accessing their bookmark anywhere on any platform. Additionally, these tagged-based online bookmark systems let users collaboratively associate any keywords to a web page of interest which is chosen by users to store keywords associated with the web page for annotating and categorizing content, which also called "folksonomy" in Web 2.0 terminology. The tagged-based online bookmark systems have advantage over existing browser-based bookmark systems in that they are not required to store the bookmarks in tree-style category, and users can organize their bookmark by its semantics.

FIG. 1A shows three interfaces of conventional tag-based online bookmark systems, respectively as DEL.ICIO.US, DOGEAR and FURL. These systems either re-direct the web page of interest to an associated bookmark system, or pop up a new window asking for a user's input. The windows 102, 104 represent the web pages which a user is interested in. When a user desires to bookmark the web page, an add-on button associated with a bookmark website server on the bookmarks toolbar of a browser will be clicked, e.g., "Furl It" button 106 as shown in FIG. 1A. The add-on button may be embodied as a plug-in for a browser, namely as a bookmark plug-in. Then, the browser pops up a new window, such as the window 108 related to the FURL bookmark website, for entry by the user. As illustrated, shown in the window 108 of FURL, there is a field 110 for the user to input preferred topics and a field 112 for the user to input comments, clippings and keywords. The topics used in FURL are similar to the tagging feature of other social bookmark websites, while the comments used in FURL are similar to the notes used in DEL.ICIO.US bookmark website. Additionally, comments, clippings and keywords may be given greater weight while searching.

On the other hand, if there is a built-in link to a bookmark website shown in web pages of interest, the user can click the built-in link to the bookmark website, and then re-direct to the bookmark website server so as to enter a default web page of the bookmark website for the user's input, as the window 100 of DEL.ICIO.US shown in FIG. 1A.

FIG. 1B is a work flow diagram of using a conventional FURL online bookmark system. In step 152, a user first locates and displays a web page of interest. In step 154, the user determines whether to bookmark the web page. Upon determining to bookmark the web page, the user clicks an add-on button associated with a bookmark website server on the bookmarks toolbar of a browser, such as the above-mentioned "Furl It" button 106. The browser thus retrieves the URL of the current web page and sends it to FURL server (step 156). In step 158, the browser pops up a new window to display a FRUL bookmark dialogue box (e.g. the window 108) bearing suggested keywords to the user for input. The suggested keywords are generated at the server side and then returned to the user side after the user determines to bookmark the web page. The user may input tags and/or notes (step 160). In step 162, the browser sends the tags and/or notes to FURL and closes the dialogue box, and then the process proceeds to the step 152.

However, these conventional tag-based bookmark systems mentioned above cannot suggest accurate keywords to the user. They either only provide a hint of what other tags had been associated with this page, or just highlight what is the user's hottest tag so far. They don't perform context analysis on the target web page so that the suggestions might not always make sense. Another problem of these systems is that they all take considerable time to finish the bookmarking process. As above-mentioned, they either re-direct the web page of interest to an associated bookmark system (as shown in the window 100 of DEL.ICIO.US shown in FIG. 1A), or pop up a new window asking for a user's input (as shown in the window 108 of FURL shown in FIG. 1A). Since these systems all start generating suggestions only after a user decides to bookmark the web page, and then return the suggestions to the user, it is inevitably that the user suffer from the server processing delay and network latency. Furthermore, current available solutions don't also provide a user-friendly interface to highlight tags. For example, all suggested keywords (or tags) look the same, namely same color and same size.

SUMMARY OF THE INVENTION

According to one embodiment of the present invention, it includes a lightweight inference engine as a plug-in for a browser that performs a back-ground reasoning. Once a user is ready to bookmark a desired web page, the inference engine could provide suggestions that are highly relevant to the core idea of the web page (e.g. recommended keywords or tags). As the inference engine is performed in the background to asynchronously analyze the content of the web page and provide the best suggestion for the page, the longer the user stays in that web page, the more precise the keywords or tags related to the web page and suggested by the inference engine will be. Furthermore, the server processing delay and network latency will be reduced because the engine is run in the background and all actions takes place in a local browser.

The embodiment of the present invention also discloses a new window to display a list of suggestions against a web page. These suggestions may be highlighted with different font sizes and colors to give a user a different feeling for each suggestion of importance. Compared with the conventional tag-based bookmark systems, the present embodiment is more time-saving and user-friendly.

Several embodiments of the present invention are provided, such as a method, a system and a computer program product for providing suggested tags associated with a target web page for manipulation by a user. The method includes the following steps: generating a list of keywords associated with the target web page as suggested tags; adding the keywords as suggested tags into the page and transforming the page bearing the keywords into an HTML file, while the user decides to bookmark the page; and creating a layer of new transparent or semi-transparent window overlaying an original window displaying the page, the transformed page with said keywords being rendered on the new window for displaying the suggestion for the user's manipulation.

BRIEF DESCRIPTION OF THE DRAWINGS

The embodiments of the present invention will be described in detail, with reference to the following figures, wherein:

FIG. 7 is an example of a layer stylesheet according to one embodiment of the present invention.

FIG. 8 is an example of a CSS transformation stylesheet according to one embodiment of the present invention.

DETAILED DESCRIPTION OF THE PREFERRED EMBODIMENTS

Figure 1A:
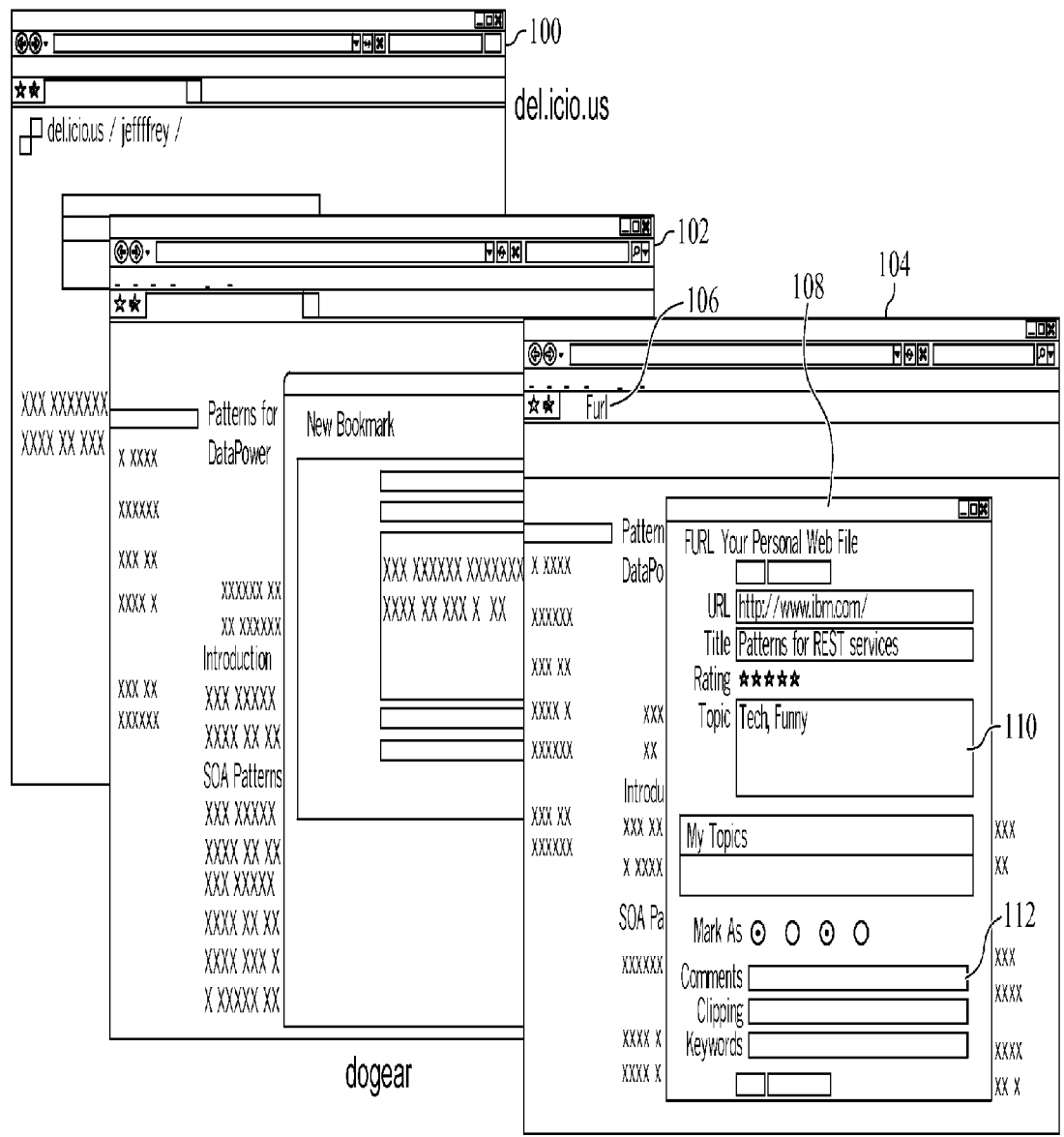
FIG. 1A shows three interfaces of conventional tag-based online bookmark systems, respectively as del.icio.us, dogear and furl.
Figure 1B:
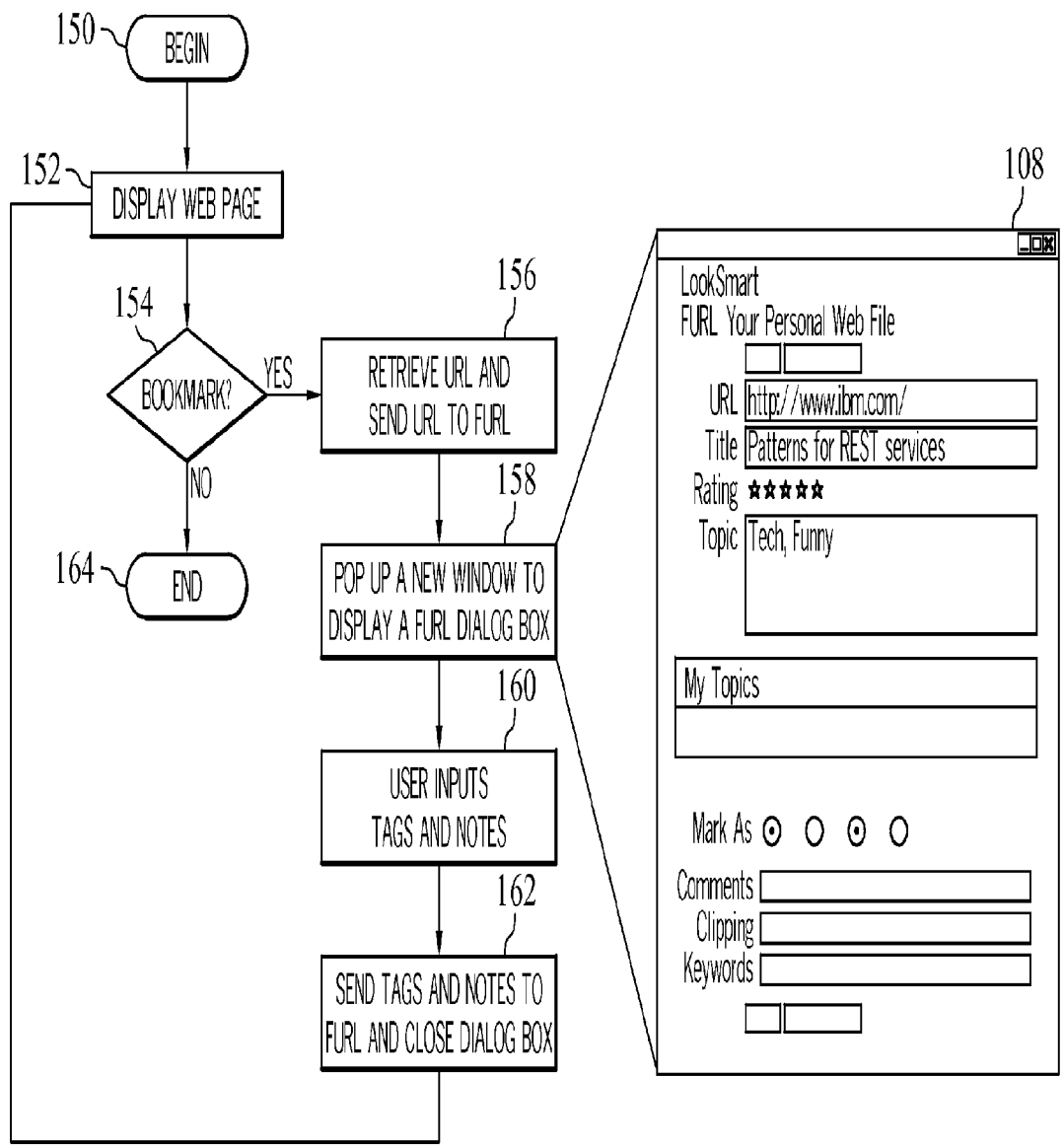
FIG. 1B is a work flow diagram of using a conventional FURL online bookmark system.

The following describes various exemplary embodiments. The disclosed embodiments are only for illustration. Thus, it will be understood by those skilled in the art that there are many modifications that may be made to the various embodiments described herein without departing from the spirit and scope of the disclosure. Throughout the drawings, similar features are identified by similar reference numerals.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
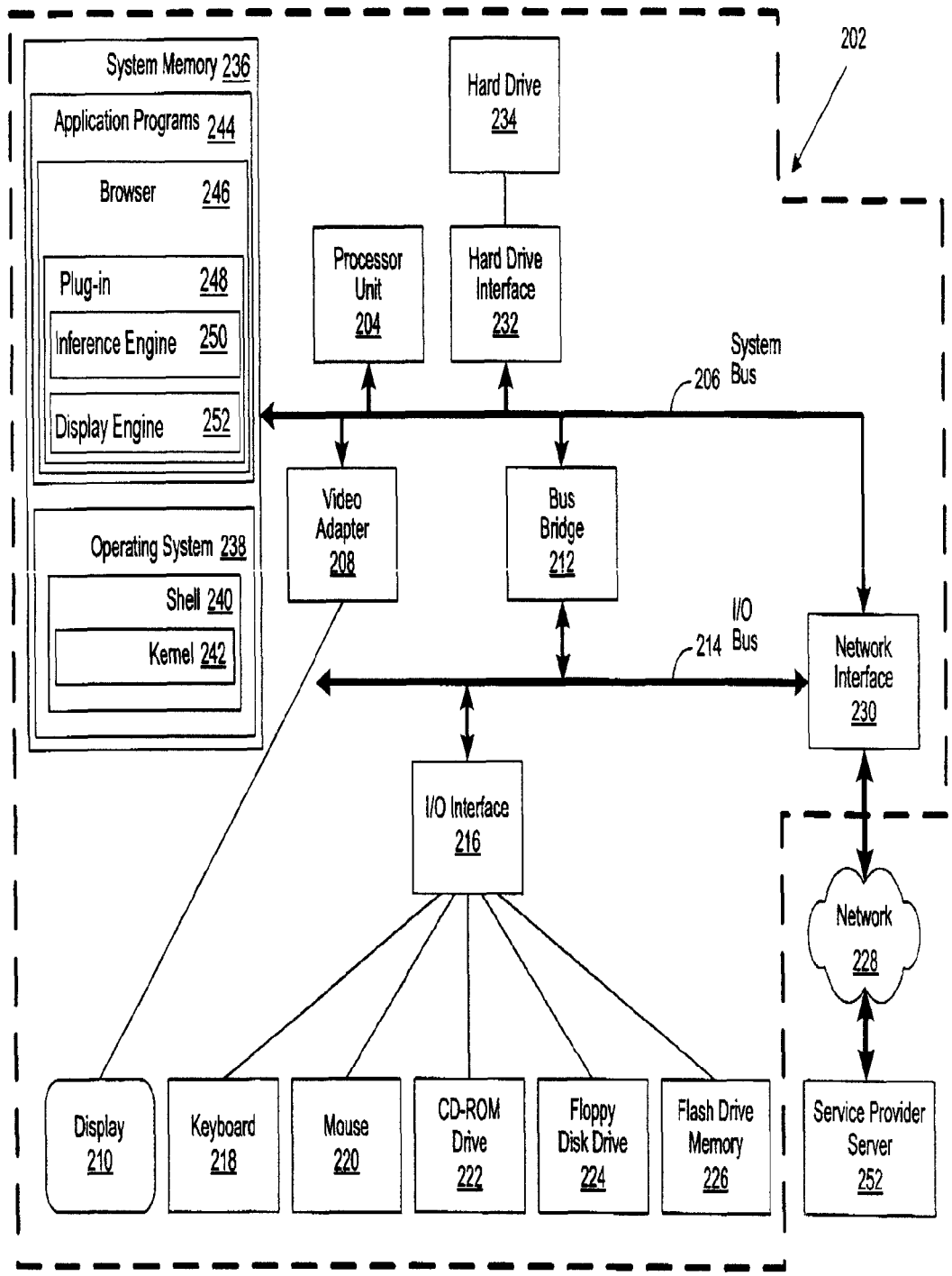
FIG. 2 is an exemplary block diagram of client computer according to one embodiment of the present invention.

FIG. 2 is an exemplary block diagram of client computer 202 according to one embodiment of the present invention. Client computer 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Client computer 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to the system bus 206. Hard drive interface 232 interfaces with a hard drive 234. In a preferred embodiment, hard drive 234 populates a system memory 236, which is also coupled to system bus 206. Data that populates system memory 236 includes the client computer's 202 operating system (OS) 238 and application programs 244.

OS 238 includes a shell 240 for providing transparent user access to resources such as application programs 244, and a kernel 242. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc. As depicted, OS 238 also includes kernel 242, which includes lower levels of functionality for OS 238, including essential services required by other parts of OS 238 and application programs 244, including memory management, process and task management, disk management, and mouse and keyboard management.

Application programs 244 may include a browser 246. Browser 246 includes program modules and instructions enabling a World Wide Web (WWW) client (i.e., client computer 202) to send and receive network messages to the Internet using Hyper Text Transfer Protocol (HTTP) messaging, thus enabling communication with a service provider server 252. Browser 246 also has a plug-in 248 including an inference engine 250 and a display engine 252. The inference engine 250 and the display engine 252 include code for implementing the processes described in FIGS. 4-6 described hereinafter. In one embodiment, client computer 202 is able to upload the selected tags/topics and inputted notes/comments to a bookmark system of a service provider server 252.

The hardware elements depicted in client computer 202 are not intended to be exhaustive, but rather are representative to highlight components used by the present invention. For instance, client computer 202 may include alternate memory storage devices such as, but not limited to, magnetic cassettes, Digital Versatile Disks (DVDs), Bernoulli cartridges, and the like. These and other variations are intended to be within the spirit and scope of the present invention.

Figure 3A:
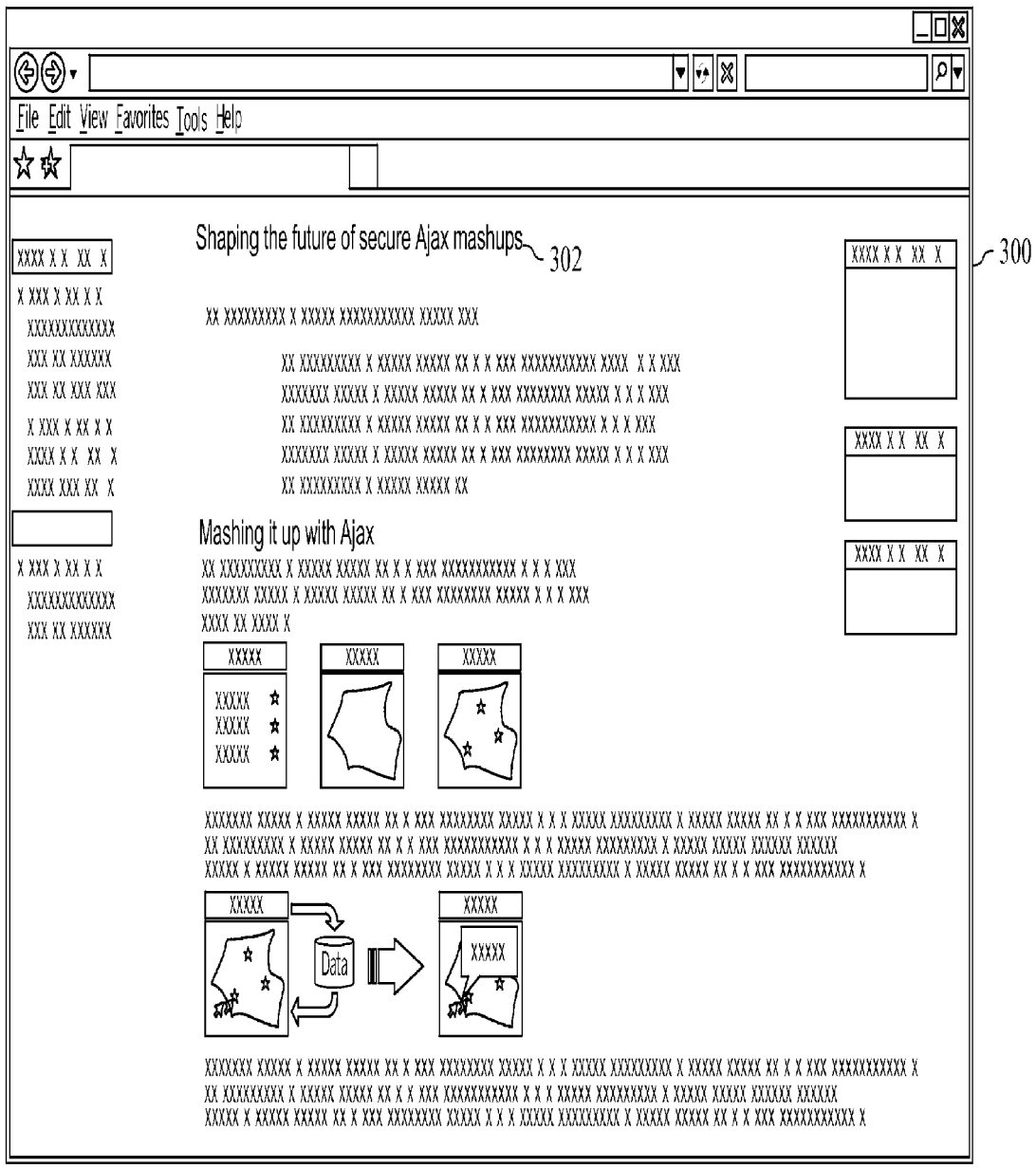
FIG. 3A shows an exemplary web page of interest that a user wants to bookmark according to one embodiment of the present invention.
Figure 3B:
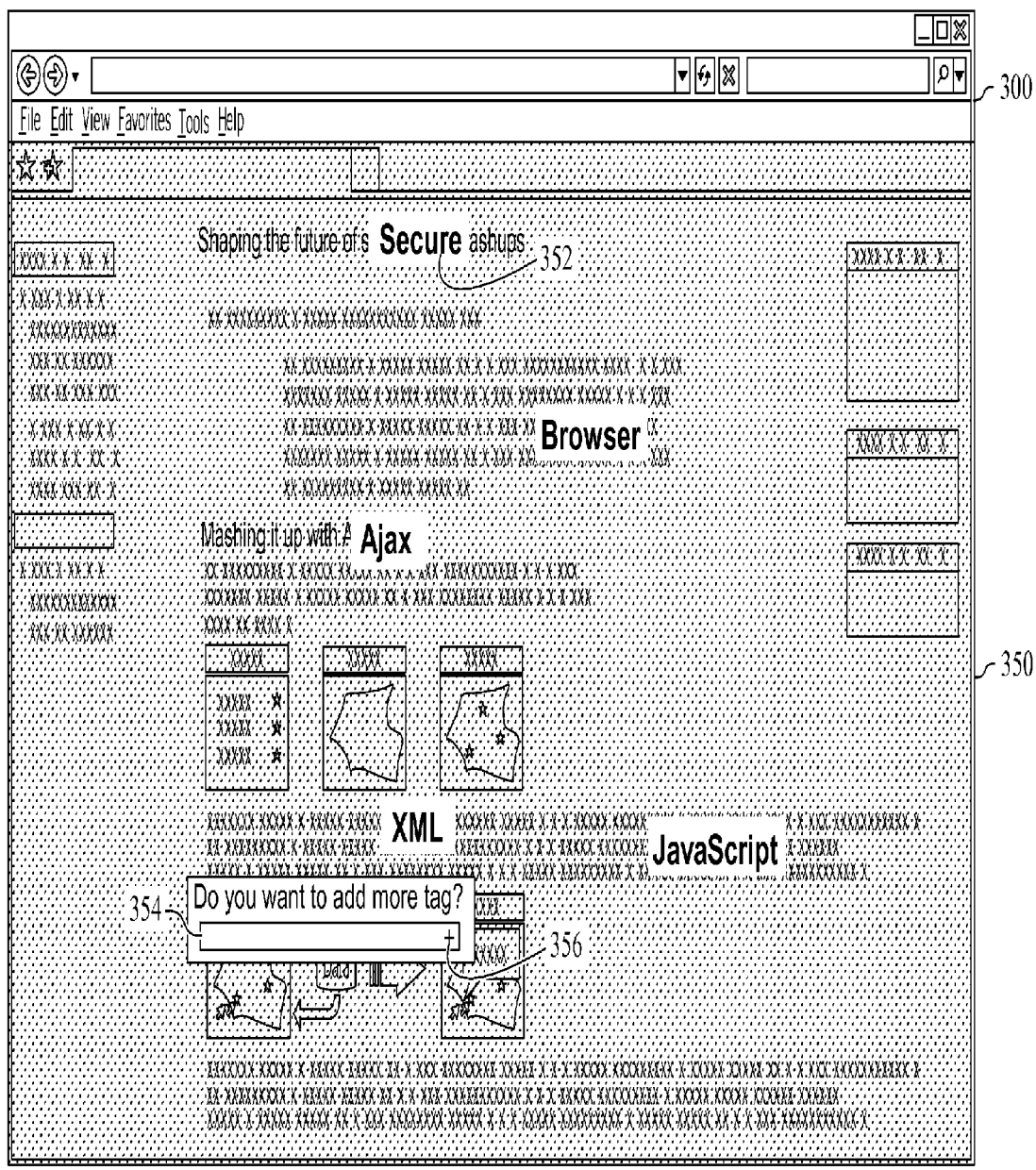
FIG. 3B shows a layer of new transparent or semi-transparent window overlaying an original window, and also shows suggested keywords as tags related to the web page for a user's selection and input.

FIG. 3A shows an exemplary web page of interest that a user wants to bookmark according to one embodiment of the present invention. As shown, the window 300 displays a web page of which the headline 302 is "Shaping the future of secure Ajax mashups". FIG. 3B shows a layer of new transparent or semi-transparent window 350 overlaying the original window 300, and also shows suggested keywords as tags related to the web page for a user's selection and input. The keywords are hereinafter able to be referred to as tags. The suggested tags shown in the layer of new window 350 may be highlighted with different font sizes and colors, such as Secure 352, Ajax, XML JavaScript and Browser shown in FIG. 3B, to give the user a different feeling of the each tag importance. The tags with higher relevance will be displayed with more noticeable style so that the user can identify these tags immediately. Note that, if the suggested tags exist in the web page of the original window 300, they will be rendered preferably right on the top of the tags of the web page of the original window 300 so that the user can easily figure out under what context our plug-in would recommend the tags.

New window 350 further includes an input region 354 and a send button 356. By clicking the highlighted tags (for example, clicking the tag "Secure" 352), the tags may be moved to the input region 354. The user may also manually add any tags which are meaningful to him into the input region 354. The inputted and/or clicked results will be sent to a bookmark server upon clicking the send button 356. The input region 354 may further include a comment region for a user to input comments, clippings and keywords, as the field 112 of the above-mentioned FURL.

Figure 4:
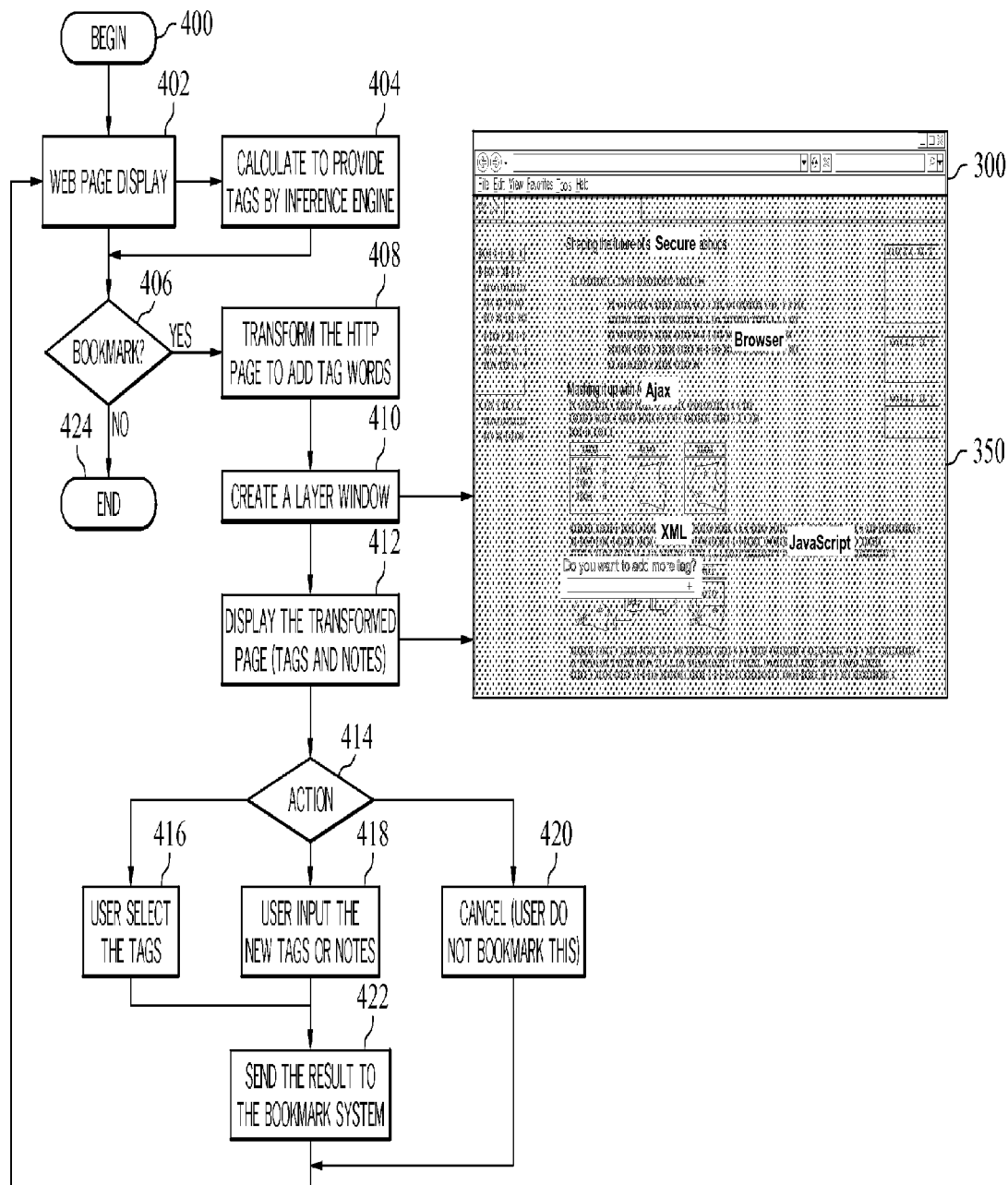
FIG. 4 is a work flow diagram of an on-line bookmark system according to one embodiment of the present invention.

FIG. 4 illustrates a work flow diagram of an on-line bookmark system according to one embodiment of the present invention. The user locates a web page which is displayed in the original window 300 (step 402). The inference engine 250 as a plug-in for browser will be automatically performed in the background to directly compute for generating a list of suggested tags (step 404). Each tag will be associated with a priority. The longer the user stays in that web page, the more precise the tags related to the web page, which the inference engine 250 can suggest, will be. The inference engine 250 will be further described in more detail with reference to FIG. 6. In step 406, the user will determine whether to bookmark the web page. Upon determining to bookmark the web page, the user clicks an add-on button associated with a bookmark website server on the bookmarks toolbar of a browser, which is similar to the above-mentioned "Furl It" button 106. The display engine 252 of the plug-in for browser is thus initiated to add the tags suggested by the inference engine 250 into the web page, and then transform the web page into a HTML file including the suggested tags for display as a transformed web page (step 408). As an alternative, another embodiment of the present invention may arrange a function key to initiate the display engine 252. The display engine 252 will be further described in more detail with reference to FIG. 5.

In step 410, the display engine 252 creates a layer of new transparent or semi-transparent window 350 overlaying the original window 300 displaying the web page. As mentioned above, the layer of new window 350 includes the input region 354 and the send button 356 according to one embodiment of the present invention. The transformed web page will be displayed on the new window 350 for displaying the suggested tags to the user for selection and input (step 412). If the suggested tags exist in the web page of the original window 300, they will be rendered preferably right on the top of the tags of the web page of the original window 300.

In step 414 as shown in FIG. 4, the process determines what the user's choice is. If the user decides to directly input tags into the input region 354 (step 418), or directly click the suggested tags (step 416), the inputted and/or clicked results will be sent to a bookmark server upon clicking the send button 356 (step 422), and remove the layer of new window 350. The process shown in FIG. 4 then returns back to step 402 to start another bookmark request. On the other hand, if the user does not want to bookmark the web page, the user can directly click the send button 356 for cancellation to directly remove the layer of new window 350 and return back to step 402. The input region 354 may further include a comment region for a user to input comments, clippings and keywords as the conventional bookmark websites do.

Figure 5:
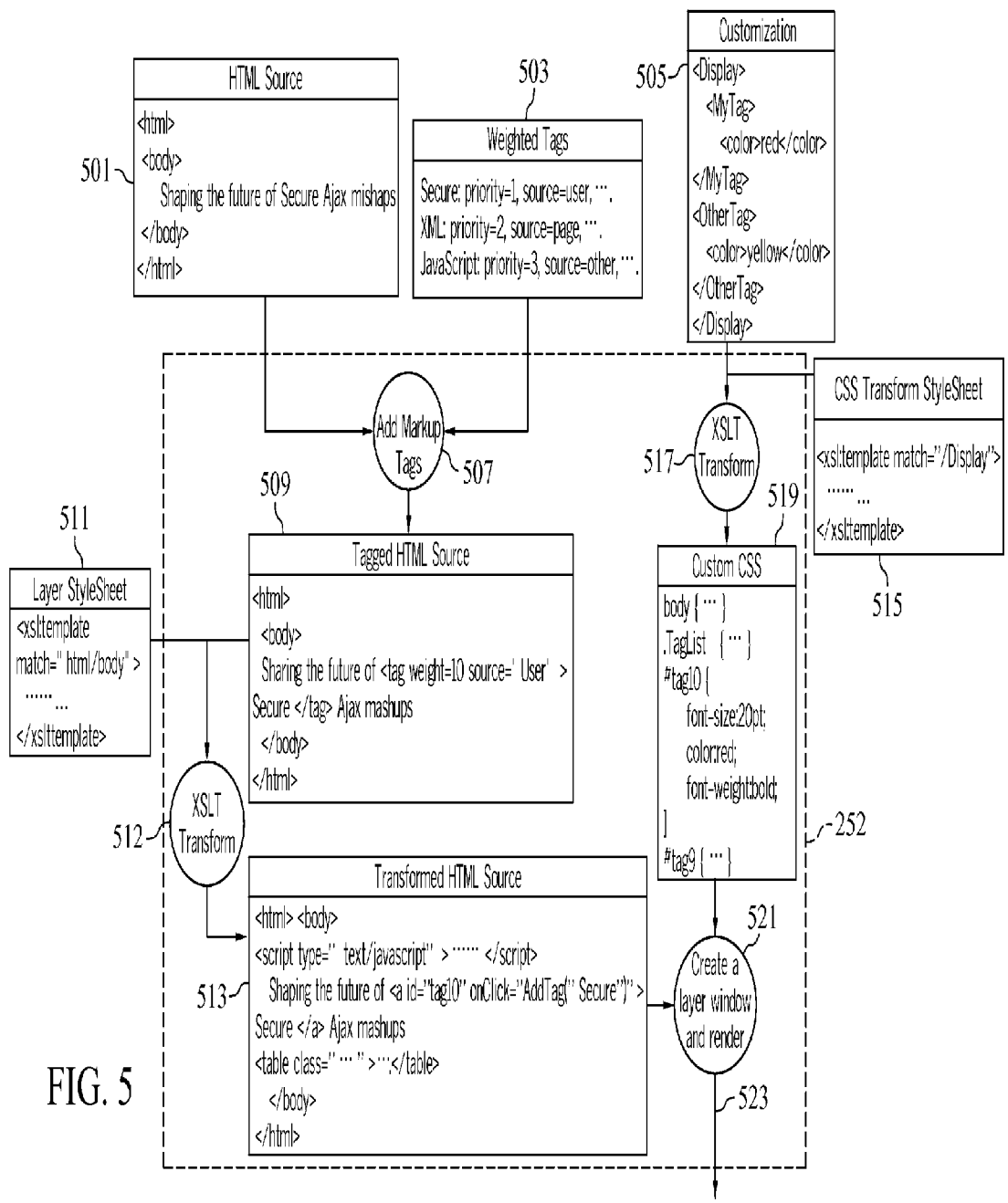
FIG. 5 is a work flow diagram illustrating a display engine of a browser plug-in according to one embodiment of the present invention.

FIG. 5 is a work flow diagram depicting a display engine 252 of a browser plug-in illustrating a method of creating a layer of new transparent or semi-transparent window 350 including an input region 354, a send button 356 and a plurality of suggested tags (or keywords) according to one embodiment of the present invention. In step 507, the display engine 252 adds the tags received from the weighted tags file 503 generated from the inference engine 250 into the HTML source file 501 of the web page of interest, and thereby generates a tagged HTML source 509. The weighted tags file 503 includes a list of tags recording a source of each tag and a priority associated with the each tag. For example, as shown in the tags file 503 of FIG. 5, if the "Secure" of the headline 302 shown in FIG. 3A is the tag generated by the inference engine 250 and thus previously used, the priority is set to "1", and the source is "user", namely the first line "Secure: priority=1, source=user" shown in the weighted tags file 503 of FIG. 5. If the "XML" of the web page 300 shown in FIG. 3A is the tag easily generated by the inference engine 250 from the content of the current web page 300, the priority is set to "2", and the source is "page", namely the second line "XML: priority=2, source=page" shown in the weighted tags file 503 of FIG. 5. The priority of the tag may thus be regarded as an attribute of the tags. Moreover, according to the user's preference, the priority can also change its weight in accordance with the following weight table. For example, the priority of value "1" can be converted into value "10".

```
<weight_table>
    <weight priority="1">10</weight>
    <weight priority="2">9</weight>
    <weight priority="3">8</weight>
</weight_table>
```

In step 512, the display engine 252 proceeds a XSLT transformation of the tagged HTML source file 509 into a transformed HTML source file 513 through an XSLT processor by utilizing a layer stylesheet 511 written in XSL transformations (XSLT), which is an XML language for transforming XML documents into HTML or XHTML documents for display as a web page. The Extensible Stylesheet Language (XSL) is used for transforming XML documents and defining a presentation format for XML documents. The XSLT is the very transformation of XSL. Most of the earlier XSLT processors were interpreters. Therefore, XSLT may transform an XML source document into an object document based on a specified transformation rule. The layer stylesheet 511 written in XSLT defines the stylesheet of the layer of the new window 350.

FIG. 7 is an example of a layer stylesheet according to one embodiment of the present invention, in which submit.gif is the icon of the send button 356. According to the embodiment of the invention, the layer stylesheet 511 is used to transform the <tag> element in the tagged HTML source file 509 into a <a> element shown in the transformed HTML source file 513 in order to insert the javascript code segment "<script type="text/javascript"> . . . /script>" used for control in a user interface into the transformed HTML source file 513, and generate a <input> element for creating the input region 354. The <a> and <input> elements are defined in the standard HTML specification.

In step 517 as shown in FIG. 5, the display engine 252 proceeds a XSLT transformation of a customization file 505, which defines the user's presentation preference of the tags, into a standard customized CSS 519, which determines a presentation style of the tags in the transformed HTML source file 513, through an XSLT processor by utilizing a cascading Style Sheets (CSS) transformation stylesheet 515 written in XSLT. Cascading Style Sheets (CSS), a standard enacted and developed by the World Wide Web Consortium (W3C), is a stylesheet language used to describe a presentation style (e.g., fonts, colors or layout etc.) of a document written in a markup language (e.g. HTML or XML). CSS is designed primarily to enable the separation of document content (written in HTML or similar markup language) from document presentation (written in CSS). FIG. 8 is an example of the CSS transformation stylesheet 515 according to one embodiment of the present invention. The example of the customized CSS is shown in below:

```
body {background-color:gray; color:gray; z-index:9;}
.TagList {background-color:#5f5f5f; color:white; font-weight: bold;}
.TagListbox {width: 20%; normal; background-color:#5f5f5f; border="0";}
#tag10 {font-size:20pt; color:red; font-weight: bold;}
#tag9 {font-size: 17pt; color:yellow; font-weight: bold;}
```

In step 521, the display engine 252 will create a layer of new transparent or semi-transparent window 350 including the input region 354 and the send button 356 based on the transformed HTML source file 513 and the customized CSS 519. The result will be outputted to the browser for display (step 523). The layer of new transparent or semi-transparent window 350 will overlay the original window 300 and highlight the suggested tags to the web page with different font sizes and colors which are the user's preference. If the suggested tags exist in the web page of the original window 300, they will be rendered preferably right on the top of the tags of the web page of the original window 300 so that the user can easily figure out under what context our plug-in would recommend the tags as mentioned above. Generally, conventional browsers could provide a support for step 521.

Figure 6:
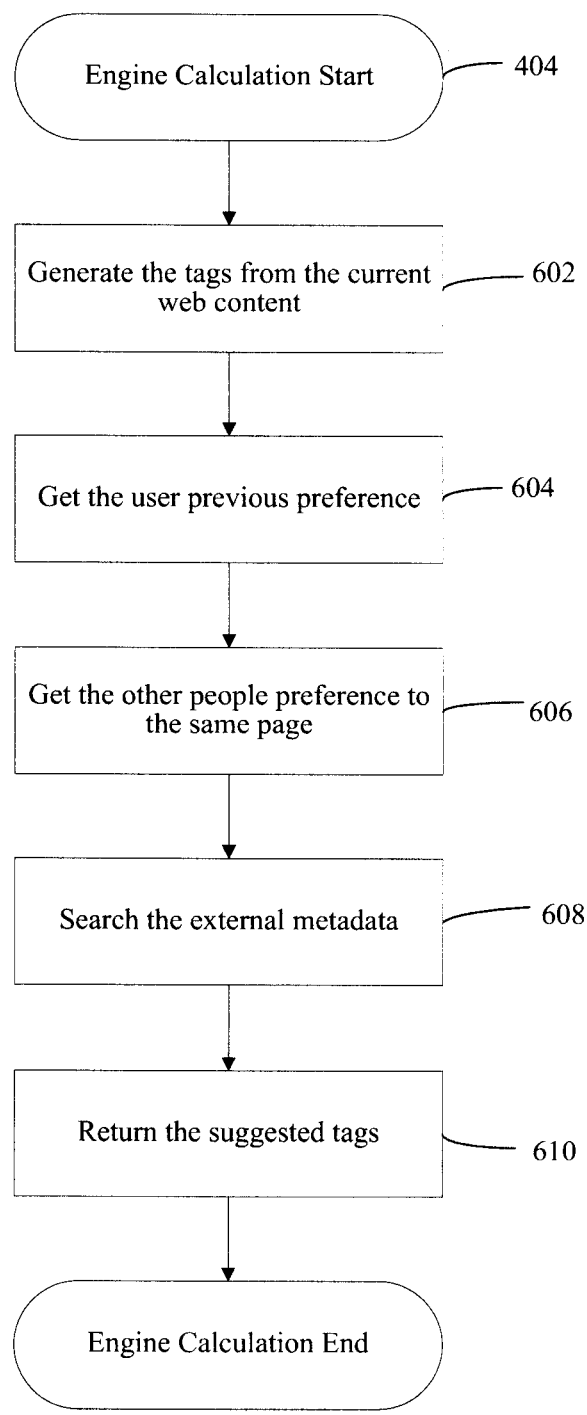
FIG. 6 is a work flow diagram illustrating an inference engine of a browser plug-in according to one embodiment of the present invention.

FIG. 6 is a work flow diagram illustrating an inference engine of a browser plug-in according to one embodiment of the present invention. When the user locates a web page which is displayed in the original window 300, the inference engine 250 will be automatically performed in the background to directly compute and generate a list of suggested keywords as tags, or also called as suggested tags (as step 404). The inference engine 250 generates tags by utilizing the content of the current web page as input (step 602). Currently, there are various techniques to generate a list of tags for an input document. One intuitive approach would be to calculate the appearance of each word and give words with higher rate if it has higher counts. For example, the conventional "Term Frequency-Inverse Document Frequency (TF-IDF) weight" technique is used to evaluate how important a word is to a document in a collection or corpus. The "term frequency" in the given document is simply the number of times a given term appears in that document, while the "inverse document frequency" is a measure of the general importance of the term. Anyway, the engine 250 will generate a list of raw suggested tags according to one embodiment of the present invention.

Next, the inference engine 250 may retrieve all the tags previously used by the user and associated with the current web page from the bookmark website, namely the user's previous preference (step 604). If there is a raw suggested tag matching one of the tags previously used by the user, then the engine 250 will increase the weight of the raw tag.

In addition to the tags previously used by the user, the inference engine 250 may also retrieve all the tags previously used by other users and associated with the same web page from the bookmark website (step 606). Similarly, the engine 250 proceeds to a step of matching the raw suggested tags with the tags previously used by the user, the engine 250 will increase the weight of each matched raw tag. In step 608, the engine may further try to collect additional metadata associated with the current web page. The metadata may preferably be any comments/notes relevant to the current web page, a blog post describing the current web page, or anything relevant to some suggested tags from wikipedia. The engine 250 will thus generate a list of most relevant suggested tags to the current web page and show them in the layer of new window 350.

Another benefit according to one embodiment of the present invention is allowing users to enrich the metadata related to the target web page, so that the tags on the web page will also become the reference of the inference process of other users. Although conventional bookmark systems also use a similar approach to provide a recommendation, they just display what are other users' tags for this same web page, and there is no inference process performed. Compared with these systems, disclosed in the embodiment of the present invention is to aggregate all available inference materials for recommendation and may perform a semantic reasoning on them. Consequently, recommendation for a web page of interest will become more and more accurate, after the multiple tagging processes mentioned as above steps 602, 604, 606 and 608.

The above-mentioned inference process of the inference engine 250 is based on four inputs as mentioned in steps 602, 604, 606 and 608, namely: the content of the current web page, the user's previous preference, tags previously used by other users and associated with the same web page, and additional metadata associated with the current web page. Actually, the previous steps may be customizable by a user. If the user does not want to spend too much bandwidth or resource calculating all relevant information in the background, he could just enable a selective set of inputs. For example, he might only want to match the raw suggested tags with the tags previously used by the user. By setting this way, the user reduces the calculation efforts with the cost of losing accuracy.

The above descriptions are recited for illustrative purpose rather than limitations. Various modifications and rearrangements may be made to the various embodiments without departing from the scope of the disclosure. For example, the present invention may be embodied in the conditions other than the conventional social bookmark websites. Besides, disclosed in the present invention may be applied to conventional applications bearing a search and/or replace feature, such as Microsoft Word™. In such case, when a user inputs a keyword or a string in a search interface, the application may display the searched results on a new transparent or semi-transparent window as the present invention does. The new window may overlay the old window of the application and highlight the searched results with different font sizes and colors. For example, if there is a word in a document of interest matching the keyword, we could highlight the word with a bigger font size and a brilliant color. On the other hand, if the word only partially matches the keyword, we could highlight the word with a smaller font size and a darker color. The user, accordingly, may be easily aware of the searched results from the new window and realize the relevance to the keyword.

The illustration of the various embodiments herein with reference to the drawings is provided for a better understanding of the characteristics and spirit of these embodiments. It will be understood that the various embodiments are not limited to the particular exemplary embodiment described herein but rather are capable of various modifications and rearrangements without departing from their scope. Therefore, it is intended that the following claims, accompanied by detailed descriptions giving the broadest explanation, not only define the scope of the various embodiments but also cover all such modifications and changes as fall within their true spirit and scope.

We claim:

1. A method for providing suggested tags associated with a target web page for manipulation by a user, comprising:
    generating in memory of a computer a list of keywords associated with a target web page in an original window as suggested tags for the target web page;
    adding said keywords as suggested tags for the target web page into said target web page and transforming said target web page bearing said keywords into a hypertext markup language (HTML) file by transforming a customization file defining presentation preference of said keywords into a customized stylesheet used to determine a presentation style of said keywords, such as fonts, colors or layouts, wherein the fonts and colors identify an importance of said keywords;
    creating a new transparent or semi-transparent window;
    adding to the new window said transformed page comprising said keywords as a suggestion set of tags for selection by an end user;
    rendering the new window with the transformed page overlaying the original window such that ones of the suggested set of tags already existing in the original window are rendered on top of the tags already existing in the original window; and,
    receiving in the new window user input of a new tag; and,
    adding the new tag as a suggested tag into the target web page and repeating the transforming of the target web page, adding the transformed target web page to the new window and rendering the new window with the transformed page overlaying the original window.

2. The method according to claim 1, wherein said generating, adding and creating is performed in a background process in the computer.

3. The method according to claim 2, wherein said method is implemented in a tag-based online bookmark system.

4. The method according to claim 2, wherein said transforming step transforms said page bearing said keywords into a HTML file by utilizing a layer stylesheet written in XSL transformation (XSLT) language, and wherein said layer stylesheet is used to define the stylesheet of said layer.

5. The method according to claim 4, wherein said transforming step further comprises a step of transforming the customization file defining presentation preference of said keywords into a customized CSS by utilizing a cascading Style Sheets (CSS) transformation stylesheet written in XSLT, and wherein said customized CSS is used to determine a presentation style of said keywords, such as fonts, colors or layouts.

6. The method according to claim 2, wherein said list of keywords are generated according to at least one of:
    as content of said web page, preference of said user, keywords previously used by other users and associated with said web page, and additional metadata associated with said web page.

7. The method according to claim 6, wherein a Term Frequency-Inverse Document Frequency ("TF-IDF") weight technique is used to evaluate how important said keywords are to said web page in order to generate said keywords according to said content of said web page.

8. A data processing system for providing suggested tags associated with a target page for manipulation by a user, comprising:
    a host;
    said host comprising:
        a bus;
        a memory connected to said bus, in which said memory comprises a set of instructions; and
        a processor connected to said bus, in which said processor executes said set of instructions to generate in the memory a list of keywords associated with a target web page in an original window as suggested tags for the target web page, to add said keywords as suggested tags for the target web page into said target web page and to transform said target web page bearing said keywords into a hypertext markup language (HTML) file by transforming a customization file defining presentation preference of said keywords into a customized stylesheet used to determine a presentation style of said keywords, such as fonts, colors or layouts, wherein the fonts and colors identify an importance of said keywords, to create a new transparent or semi-transparent window, to add to the new window said transformed page comprising said keywords as a suggestion set of tags for selection by an end user, to render the new window with the transformed page over the original window such that ones of the suggested set of tags already existing in the original window are rendered on top of the tags already existing in the original window, to receive in the new window user input of a new tag and to add the new tag as a suggested tag into the target web page and repeating the transforming of the target web page, adding the transformed target web page to the new window and rendering the new window with the transformed page overlaying the original window.

9. A computer program product embodied on a non-transitory computer usable storage medium storing thereon a computer program comprising program code that when executed in memory of a computer data processing system causes the data processing system to execute a method for providing suggested tags associated with a target page for manipulation by a user, the method comprising:
    generating in memory of a computer a list of keywords associated with a target web page in an original window as suggested tags for the target web page;
    adding said keywords as suggested tags for the target web page into said target web page and transforming said target web page bearing said keywords into a hypertext markup language (HTML) file by transforming a customization file defining presentation preference of said keywords into a customized stylesheet used to determine a presentation style of said keywords, such as fonts, colors or layouts, wherein the fonts and colors identify an importance of said keywords;

creating a new transparent or semi-transparent window;

adding to the new window said transformed page comprising said keywords as a suggestion set of tags for selection by an end user;

rendering the new window with the transformed page overlaying the original window such that ones of the suggested set of tags already existing in the original window are rendered on top of the tags already existing in the original window receiving in the new window user input of a new tag; and, adding the new tag as a suggested tag into the target web page and repeating the transforming of the target web page, adding the transformed target web page to the new window and rendering the new window with the transformed page overlaying the original window.

10. The computer program product according to claim 9, wherein said generating, adding and creating is performed in a background process in the computer.

11. The computer program product according to claim 10, wherein said method is implemented in a tag-based online bookmark system.

12. The computer program product according to claim 10, wherein said transforming step transforms said page bearing said keywords into a HTML file by utilizing a layer stylesheet written in XSL transformation (XSLT) language, and wherein said layer stylesheet is used to define the stylesheet of said layer.

13. The computer program product according to claim 12, wherein said transforming step further comprises a step of transforming the customization file defining presentation preference of said keywords into a customized CSS by utilizing a cascading Style Sheets (CSS) transformation stylesheet written in XSLT, and wherein said customized CSS is used to determine a presentation style of said keywords, such as fonts, colors or layouts.

14. The computer program product according to claim 10, wherein said list of keywords are generated according to at least one of:
as content of said web page, preference of said user, keywords previously used by other users and associated with said web page, and additional metadata associated with said web page.

15. The computer program product according to claim 14, wherein a Term Frequency-Inverse Document Frequency ("TF-IDF") weight technique is used to evaluate how important said keywords are to said web page in order to generate said keywords according to said content of said web page.

* * * * *